Dec. 27, 1938.   F. P. WHITE   2,141,579
FISHING LINE DRYING REEL
Filed Oct. 15, 1937

Inventor
*F. P. White*
By Robert Cobb
Attorneys

Patented Dec. 27, 1938

2,141,579

UNITED STATES PATENT OFFICE 2,141,579

FISHING LINE DRYING REEL

Frederick P. White, Syracuse, N. Y.

Application October 15, 1937, Serial No. 169,257

5 Claims. (Cl. 242—115)

This invention appertains to fishing line driers and the like, and more especially, to a collapsible reel device upon which a fishing line or other flexible filament may be wound to better expose the same to the air for drying purposes.

It is well known that a fishing line will rapidly deteriorate or rot if it is allowed to remain wound upon the usual fishing reel in a wet condition. This is especially true where the fishing line has been employed in salt water fishing. I am aware that a number of different types of drying reels have heretofore been proposed for facilitating drying of wet fishing lines. However, these reels have not gone into extensive use as far as I am aware, particularly because of the relatively high cost, and/or due to their bulky or flimsy construction.

The primary object of the present invention is to provide a drying reel which is of simple and inexpensive construction so that it may be marketed at a nominal cost and with a reasonable profit.

A further object of the invention is to provide a drying reel which is of especially sturdy construction, yet light in weight, and also which is composed of relatively few parts, and which may be quickly and readily collapsed into compact form so that it will occupy a minimum amount of space.

A still further object of the invention is to provide a drying reel which may quickly and easily be attached to a fishing rod butt or handle so as to permit the fishing line to be wound thereon without necessitating disassembly of the usual fishing reel from the handle. On the other hand, the drying reel may be mounted on any suitable support, and it is to be understood that it is not limited to use in conjunction with the fishing rod butt or handle.

The invention is further characterized by an improved reel construction and assembly wherein the arms of the drying reel are preferably composed of relatively thin, flat, metal stampings mounted upon a common pivot or axis and preferably providing means for releasably locking the arms in extended or operative position to receive the line to be wound thereon. In its preferred form, the locking means just referred to additionally serves to releasably lock the arms of the reel in collapsed position.

Other and further objects and advantages of the invention will be hereinafter described, and the novel features thereof defined by the appended claims.

In the drawing.

Like reference characters designate corresponding parts in the several figures of the drawing.

Figure 1:
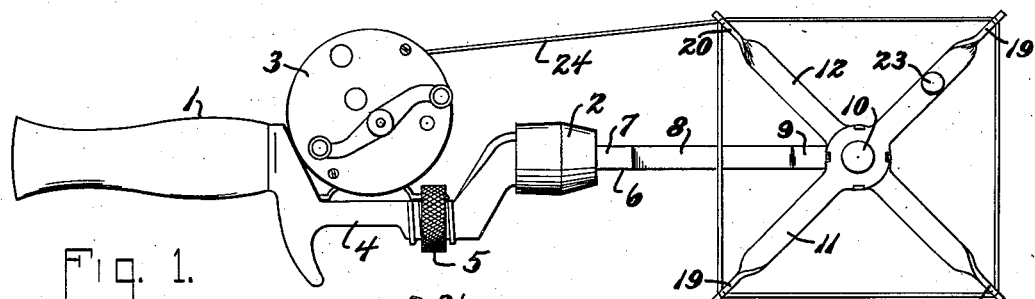
Figure 1 is a view in side elevation showing my improved drying reel applied to a conventional fishing rod butt or handle having the usual fishing line reel mounted thereon, and the fishing line in the course of being wound on the drying reel.

Referring to Figure 1, I generally designates a conventional fishing rod butt or handle having the usual socket 2 for receiving the butt end of the fishing rod (not shown). Ordinarily, the fishing rod is removable from the socket 2, and in such cases, the rod may be removed to permit my improved drying reel to be mounted on the butt I. 3 designates a conventional fishing line reel mounted on the reel seat 4 of the butt or handle I and releasably secured thereto by the conventional locking means 5. It is to be understood that the construction just described is not material to my invention, and has merely been referred to by way of an example illustrative of a typical use of my invention.

Figure 2:
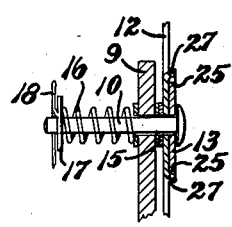
Figure 2 is a fragmentary detail sectional view, taken through the pivotal axis of the drying reel, and illustrating one type of instrumentality which serves to interlock the arms of the reel in extended position.
Figure 3:
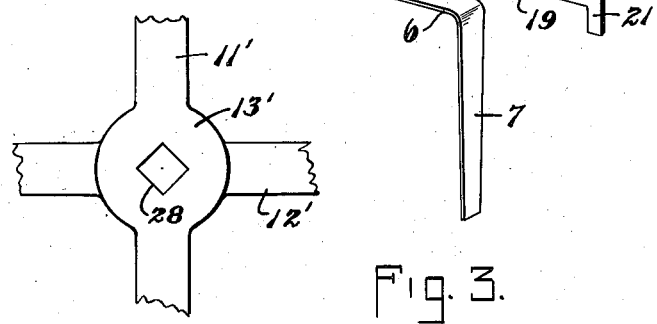
Figure 3 is a perspective view of the drying reel illustrated in Figures 1 and 2.

Passing now to the drying reel, and referring particularly to Figures 1 to 3, inclusive, 6 generally designates a standard or connecting member, which may be a metal stamping or punch press product, one end 7 of which is preferably tapered to permit the same to be received with a tight friction fit in the socket 2 of the fishing rod butt or handle 1 after removal of the fishing rod from the handle socket. Different manufacturers of fishing rods usually make the butt sockets of different sizes, but through provision of the tapered end 7 on the standard 6, the same standard may be employed to fit into the sockets of the various makes of rod butts or handles. Of course, other suitable means may be availed of to secure the standard 6 to the butt 1, if preferred.

The standard 6 is preferably provided intermediate its ends with an offset 8, the purpose of which will hereinafter more fully appear. The end 9 of the standard 6, opposite to the end 7, is preferably axially aligned with the latter, and adjacent to the free extremity of the end 9, there is provided an aperture for the reception of a bolt or pivot pin 10 constituting an axle upon which the reel arms 11 and 12 of the drying reel are mounted. As best seen in Figure 2, the reel arms 11 and 12 are composed of separate elements arranged contiguously in side-by-side relation, and each of the arms is provided with a central hub 13 and 14 having registering apertures through which the pin or bolt 10 passes. Spacer means, such as one or more thin washers 15, are preferably interposed between the inner hub 14 and the end 9 of the standard 6 upon which the reel arms 11 and 12 are mounted. The bolt or pin 10 is extended to one side of the standard, opposite to the side at which the reel arms 11 and 12 are disposed, and a coil spring 16 is placed over the extended end of the pin, with one end of the spring abutting against the end 9 of the standard. A washer or other suitable abutment 17 is applied to the outer end of the pin or bolt 10 to form a seat for the opposite end of the spring 16, and a cotter key or other equivalent fastening means 18 serves to maintain these parts in assembled relation, with the spring partially compressed. Thus, the two hubs 13 and 14 are normally yieldably urged into engagement with each other and towards the end 9 of the standard. The spring 16 also serves the additional function of a tensioning means or brake to prevent the reel arms 11 and 12 from being too freely rotatable on the axle or bolt 10, as will hereinafter more fully appear.

Each of the reel arms 11 and 12 is preferably composed of a flat, thin, metal stamping having the hubs 13 and 14 formed substantially midway between the opposite ends of the respective arms. The opposite ends of the reel arms are substantially T-shaped, and after stamping out or otherwise blanking out the arms, the outer extremities are twisted at right angles to the intermediate portions of the arms so as to form the transverse line bearing portions 19 and 20 at the opposite extremities of the respective arms 11 and 12. Ears 21 and 22 are preferably provided at the opposite ends of the respective line bearing portions or cross members 19 and 20 so as to retain the fishing line upon the line bearing portions of the drier arms. These ears are preferably integrally formed with the line bearing portions 19 and 20, which in turn, are also preferably integral with the respective arms 11 and 12. Through reason of the integral construction just described, the drying reel arms may be made at very small cost, especially if a simple metal stamping operation is availed of. Through selection of a suitable thickness of the metal blank from which the reel arms are stamped, the arms will be substantially rigid and sufficiently sturdy and rugged to withstand rough or careless handling or use. One of the arms, such as the arm 11, is preferably provided with a handle 23 by means of which rotation may be imparted to the drying reel so as to enable the fishing line 24 to be wound onto the same from the fishing reel 3, as shown in Figure 1, or from a spool or other source.

Suitable provision is made to releasably lock the reel arms 11 and 12 in their operative or extended position wherein the arms are disposed at right angles to each other, as best shown in Figures 1 and 3, such means also preferably permitting the arms to be collapsed, as best seen in Figure 3. In Figures 1 to 3, inclusive, I have shown one simple form of such locking means, in which the hub 13 is provided with a plurality of notches 25 and 26 formed in the peripheral edge of the hub. The notches are preferably arranged in pairs displaced substantially ninety degrees about the axis of the hub 13, the notches of each pair being substantially diametrically opposed. The hub 14 is provided with a pair of diametrically opposed lugs 27, integrally formed therewith and bent laterally from the peripheral edge thereof for cooperation with the notches 25 and 26. In the extended or operative position of the reel arms 11 and 12, as shown in Figures 1 to 3, inclusive, the lugs 27 are received in the notches 25, thus positively restraining the arms from rotative movement relative to each other. By reason of the action of the spring 16 which serves to yieldably urge the hub 13 towards the hub 14, the lugs 27 are maintained in engagement with the notches 25 when the arms are adjusted to their extended position, thus preventing accidental collapse of the reel. In order to collapse the arms of the winding reel, the hub 13 of the arm 11 must be urged laterally away from the hub 14, against the force of the spring 16, until the lugs 27 are disengaged from the notches 25, following which the arms may be collapsed or brought together so that the arm 12 is substantially aligned with the arm 11, and the transverse line bearing portions 20 of the arm 12 are positioned closely adjacent to the corresponding line bearing portions of the arm 11, as shown in broken lines in Figure 3. In this collapsed or folded condition of the reel arms, the lugs 27 preferably engage the other pair of notches 26 in the hub 13, thereby positively locking the arms against relative rotative movement to positively maintain the reel in collapsed condition. This locking of the reel in collapsed or folded condition is not absolutely essential, and the notches 26 may be omitted if desired. However, I preferably employ a locking means which functions to lock the reel arms against relative movement in their collapsed as well as extended positions.

Figure 5:
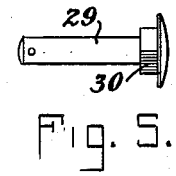
Figure 5 is a detail view in side elevation of a bolt or pivot pin which is adapted to be used in conjunction with the type of assembly illustrated in Figure 4, and showing a square shank on the bolt or pin which is adapted to be engaged in the square apertures at the center of the reel arms for restraining the arms against relative movement respecting each other.
Figures 4, 7:
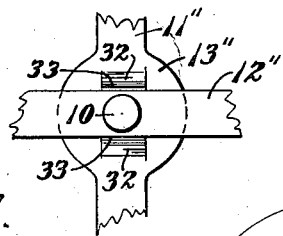
Figure 4 is an enlarged fragmentary detail view in side elevation of a modified assembly, illustrating a somewhat different means for locking the arms of the drying reel in extended position.
Figure 7 is a fragmentary detail view in side elevation of the construction illustrated in Figure 6.

Referring to Figures 4 and 5, I have shown a modified construction wherein the locking means for restraining the drying reel arms against relative rotative movement is of somewhat different construction from that just described and shown in Figures 1 to 3. In this modified construction, the hubs 13' and 14' at the center of the reel arms 11' and 12' are each provided with a rectangular or square opening 28, as shown in Figure 4, and are adapted to receive a pin or bolt 29, generally similar to the bolt 10 of Figure 2. The bolt or pin 29 is provided with a square shank 30 at its head end, as shown in Figure 5, and in this respect differs from the bolt or pin 10. The length of the square shank 30 of the bolt or pin 29 is preferably equal to the combined thickness of the two hubs 13' and 14' of the reel arms 11' and 12', so that when the reel arms 11' and 12' are extended to their positions at right angles to each other, and the square apertures 28 are registered, the square shank 30 will be received in the square apertures 28 of both hubs 13' and 14', thus locking the arms 11' and 12' against rotative movement relative to each other, and permitting the drying reel to be rotated so as to enable the fishing line to be wound thereon. The assembly of the reel arms, the bolt 29 and the standard 6 may otherwise be the same as that previously described and shown in Figures 1 to 3, the only difference residing in the locking means for restraining the reel arms against relative movement. When the locking means shown in Figures 4 and 5 is employed, the reel arms may be collapsed or folded together in the same manner as previously described, that is, by forcing the hub 13' laterally away from the hub 14', against the force of the spring 16, thereby withdrawing the square shank 30 of the bolt 29 from the square aperture in the hub 14', following which the arms may be brought together to the collapsed position shown in broken lines in Figure 3. If desired, the construction of the square aperture in the hub 14', and the square shank 30 of the bolt or pin 29, may be such that the shank 30 is permitted to be reengaged in the aperture of hub 14' after folding or collapsing the reel arms, thereby locking the arms together in their collapsed condition. To release the reel arms from a locked collapsed or folded condition, it is merely necessary to again separate the hubs 13' and 14' as by moving the hub 13' away from the hub 14', to withdraw the square shank 30 of the pin 29 from the square aperture in the hub 14', following which the arms 11' and 12' may be moved to their extended positions at right angles to each other, again bringing the square apertures in both hubs 13' and 14' into register with each other, and permitting the square shank 30 to be reengaged in the square aperture of the hub 14', and locking the two hubs together. The spring 16 serves to yieldably maintain the locked relationship of the parts.

Figure 6:
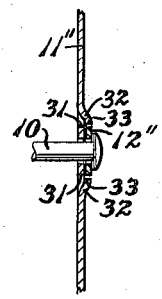
Figure 6 is a fragmentary detail sectional view illustrating another modified locking means construction which serves to restrain the reel arms against relative movement.

Passing now to Figures 6 and 7, I have shown still another modified type of arm locking means. In this construction, the reel arm 11'' is similar to the construction shown in Figures 3, and is provided with the central hub 13'' having a round aperture therein for receiving the pin or bolt 10. At opposite sides of the central aperture in the hub 13'', and somewhat spaced therefrom, the hub is slit, as at 31, and depressed laterally, as at 32, thereby forming a pair of spaced protuberances 33, one at each side of the central axis of the hub, which together define a channel into which the mid portion of the reel arm 12'' is adapted to be received, when the reel arms are extended to their operative positions at right angles to each other. In this instance, the arm 12'' is not provided with a central hub, but instead is substantially uniform in width throughout its length, so as to enable the mid portion of the arm 12'' to be received intermediate the protuberances 33 which are struck out from the hub 13'' of the arm 11'', as shown in Figures 6 and 7. The general assembly of the reel arms and the standard 6 is substantially the same in this modified construction as previously described, and includes the spring 16 positioned on the bolt or pin 10 so as to yieldably urge the reel arms 11'' and 12'' together at their centers, thus maintaining the interlocked relationship when the arms are extended to their operative positions to receive the fishing line which is to be wound thereon. To collapse the reel arms to their folded positions, the arm 12'' is pressed laterally to disengage the same from the protuberances 33, after which the arms may be freely moved relatively to each other. In the form of the locking means illustrated in Figures 6 and 7, no provision is made for positively locking the arms in their collapsed condition, but due to the force or tension of the spring 16 which is adapted to be used in conjunction with the pin or bolt 10, and which normally forces the intersecting portions of the reel arms, one against the other, the arms will be frictionally maintained in their collapsed position. On the other hand, additional provision for positively locking the arms in collapsed condition may be provided if preferred.

When the drying reel is securely attached to a fishing rod butt or handle, as by inserting the tapered end 7 of the standard 6 into the socket 2 of the rod butt 1, and the reel arms 11 and 12 are extended and locked in their operative positions, the end of the fishing line 24 on the fishing reel 3 may be secured to one of the drying reel arms so that upon rotation of the drying reel through means of the handle 23 mounted upon one of the drying reel arms, the wet fishing line may be withdrawn from the fishing reel 3 and wound upon the drying reel. The line will be received upon the line bearing cross members 19 and 20 of the drying reel arms 11 and 12, and will be retained thereon by the ears 21 and 22 at the opposite ends of the line bearing portions. During rotation of the drying reel, the offset 8 in the standard 6 will afford sufficient clearance for the cross members 19 and 20 to prevent the standard from interfering with the rotation. When the line has been wound upon the drying reel, it will be better exposed to the air and allowed to thoroughly dry. After the line has been sufficiently dried, it may be rewound upon the fishing reel 3 in an obvious manner. During the rewinding of the line upon the reel 3, it will unwind evenly and uniformly from the drying reel without necessitating dismounting the drying reel from the rod butt. The spring 16 will impart a sufficient tension or braking action to the drying reel to prevent the drying reel from rotating too fast during the rewinding of the fishing line onto the reel 3. After the rewinding has been completed, the drying reel may be dismounted from the rod butt or handle 1, and the arms 11 and 12 folded or collapsed to permit the drying reel to be put away until use thereof on another occasion is desired. In its folded or collapsed position, the drying reel occupies a minimum amount of space, and while its size may be varied as desired, the size of the preferred construction is such that it may be stored in a small tackle box or the like.

While the specific details have been herein shown and described, the invention is not confined thereto as changes and alterations may be made without departing from the spirit thereof as defined in the appended claims.

Having thus described my invention, what I claim as new and desire to secure by Letters Patent is—

1. In a device of the class described, a support adapted to be mounted on a fishing rod butt or other suitable sustaining means, a plurality of reel arms having line bearing portions rotatably mounted on said support and rotatively movable relative to each other so as to be free to be respectively collapsed together and extended to a position wherein the line bearing portions are spaced from each other, said arms being relatively flat and thin at least at their mid portions and arranged in contiguous side-by-side relation, a pivot pin extending through said arms at their flat mid portions and through said support, and means operative responsive to extension and collapse of the reel arms for positively restraining said arms against relative rotative movement in extended and collapsed positions respectively, said last named means including means for normally yieldably urging said arms close together on the pivot pin.

2. In a device of the class described, a support, a plurality of reel arms having line bearing portions rotatably mounted on said support, said arms having relatively flat and thin circular hubs at their mid portions and arranged in contiguous side-by-side relation, a pivot pin extending through said hubs and through said support, means for normally yieldably urging said arms close together on the pivot pin, and means for positively restraining said arms against relative rotative movement in at least one position, said last named means comprising a lug formed integrally with one of said hubs at the periphery thereof and bent laterally towards the other hub, and the other hub having a recess in the periphery thereof adapted to be releasably engaged with the lug aforesaid.

3. In a device of the class described, a support, a plurality of reel arms rotatably mounted on said support and each having a relatively flat hub formed midway between its opposite ends and a line bearing portion at each end arranged normally to the plane of the arm, a pivot pin extending transversely through the hubs aforesaid and through the support and serving to rotatably mount the arms on the support, and means for releasably securing the arms together on the pivot pin with their line bearing portions substantially equally spaced relative to each other, said last named means comprising a protuberance or lug extended laterally from the hub of one arm and adapted to be received in a recess formed in the hub of the other arm, and means for normally urging the hubs of the arms into close side-by-side engagement with each other, while permitting yieldable separation thereof axially on the pivot pin to effect disengagement of the protuberance from the recess aforesaid.

4. In a device of the class described, a support, a plurality of reel arms rotatably mounted on said support and each having a relatively flat hub formed midway between its opposite ends and a line bearing portion at each end arranged normally to the plane of the arm, a pivot pin extending transversely through the hubs aforesaid and through the support and serving to rotatably mount the arms on the support, and means for releasably securing the arms together on the pivot pin with their line bearing portions substantially equally spaced relative to each other and for also securing the arms in collapsed position, said last named means comprising a protuberance or lug extended laterally from the hub of one arm and adapted to be selectively received in a plurality of relatively spaced recesses formed in the hub of the other arm, and means for normally urging the hubs of the arms into close side-by-side engagement with each other, while permitting yieldable separation thereof axially on the pivot pin to effect disengagement of the protuberance from the recesses aforesaid.

5. In a device of the class described, a support, a plurality of reel arms rotatably mounted on said support and each having a relatively flat hub formed midway between its opposite ends and a line bearing portion at each end arranged normally to the plane of the arm, a pivot pin extending transversely through the hubs aforesaid and through the support and serving to rotatably mount the arms on the support, and means for releasably securing the arms together on the pivot pin with their line bearing portions substantially equally spaced relative to each other, said last named means comprising a square shank on the pivot pin having its length substantially equal to the combined thicknesses of the arm hubs, each of the hubs being provided with a square opening adapted to receive the square shank aforesaid when registered, and means for normally urging the hubs of the arms into close side-by-side engagement with each other while permitting yieldable separation thereof axially on the pivot pin to effect disengagement of the square shank of the pivot pin from the square opening in one of the hubs.

FREDERICK P. WHITE.